INVENTOR.
JONATHAN S. POWELL
BY
Lyon & Lyon
ATTORNEYS

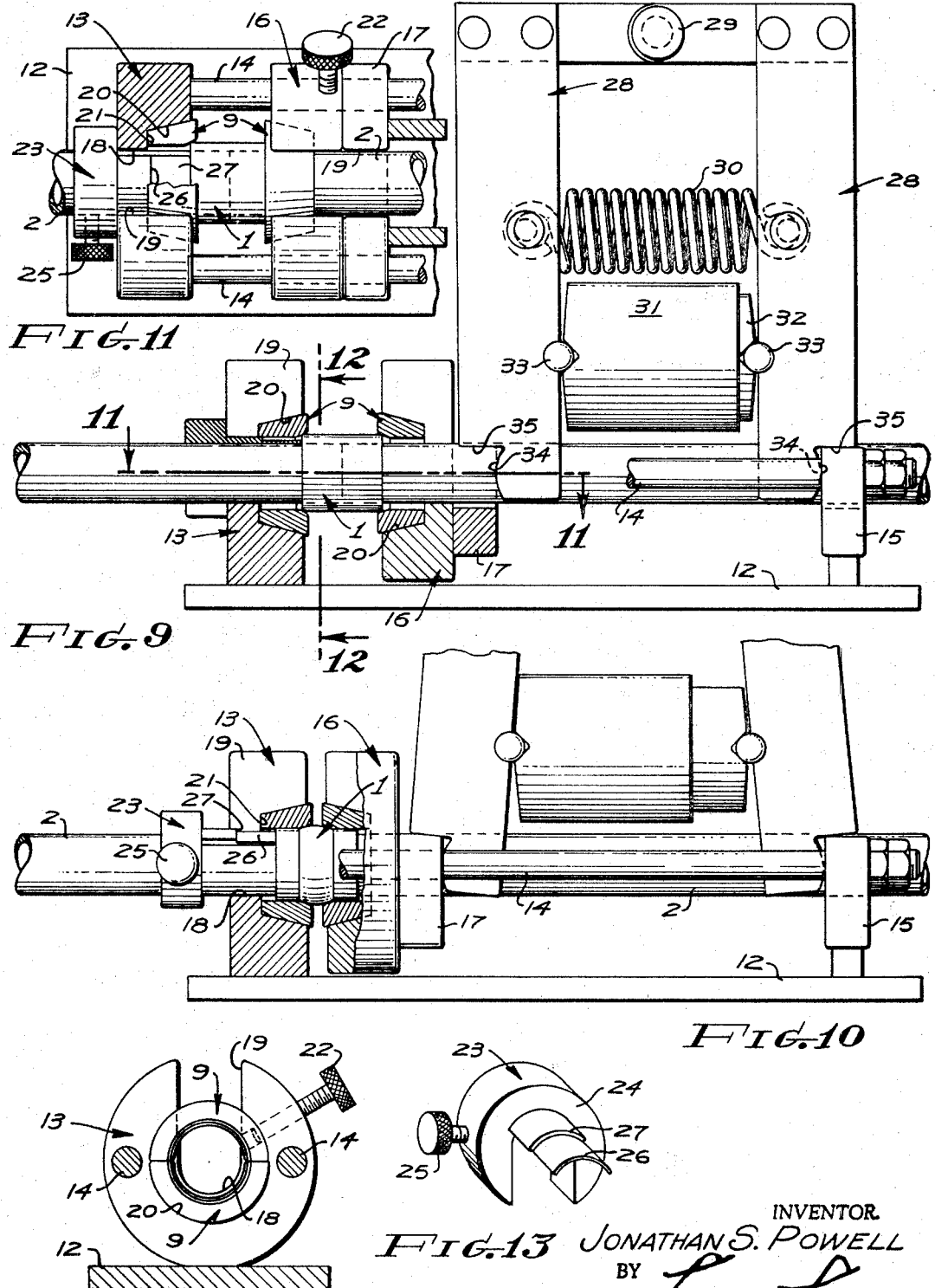

United States Patent Office 3,477,750
Patented Nov. 11, 1969

3,477,750
PIPE COUPLING AND MEANS AND
METHOD OF ASSEMBLY
Jonathan S. Powell, 1231 Brookmere Road,
Pasadena, Calif. 91105
Filed Oct. 30, 1967, Ser. No. 678,932
Int. Cl. F16l *19/00, 21/02*
U.S. Cl. 285—363                8 Claims

ABSTRACT OF THE DISCLOSURE

A pipe coupling for metal pipe in which a tubular coupling member is provided with hardened internal annular gripping teeth, the coupling being progressively acted upon by a pair of mutually approaching constricting collars so that the teeth are forced in succession into the confronting ends of a pair of pipe sections previously inserted in the coupling. Sealing means is provided in one or more of the channels between the teeth.

Background of the invention

The conventional means and methods of joining conventional iron pipe, such as domestic gas or water pipe, involves the use of couplings having, internally, tapered screwthreads, and a pair of pipe sections each having mating tapered screwthreads. These profiles and proportions of screwthreads have for many years been standardized and are commonly called "pipe threads." It is customary to coat the pipe threads with plumbers putty.

It has been the custom in assembling pipe to prepare, ahead of use, standard short lengths of pipe with screwthreads and to provide pre-screwthreaded couplings, unions, T's, elbows and the like; then in the field, cut the remaining pipe to length and cut the screwthreads immediately prior to assembly. Often, the place of assembly is in a trench or other awkward location. Clearance must be provided between adjoining pipe sections so that they may be drawn together by the coupling, and the pipe sections must be capable of rotating during assembly, otherwise a more expensive and less dependable union must be used.

In recent years, copper tubing employing soldered joints and plastic tubing employing cemented joints have been, in many cases, substituted for iron pipe.

Summary of the invention

The present invention is directed to a coupling and to a means and method of assembling the coupling and adjacent sections of iron pipe in such a manner as to save materially the cost in time and labor as compared to the assembly of pipe threaded parts. Accordingly then, the objects of my invention include:

First, to provide a coupling for iron pipe which requires no finishing of the pipe ends other than to cut the ends substantially square; the coupling having hardened teeth capable of being constricted and caused to penetrate the metal of the pipe sections to form a series of annular seals and to develop an interlocking connection with the pipe sections which exceed the strength of the pipe sections.

Second, to provide a coupling of this type which may incorporate secondary seals formed of an elastomer which is squeezed between the coupling and the pipe ends.

Third, to provide a means and method of assembling the coupling and a pair of pipe sections in which the coupling initially fits slidably over the pipe ends and is then constricted radially and progressively from its extremities toward its center so that each annular tooth is pressed individually into the metal at the pipe ends.

Fourth, to provide a pipe coupling and means and method of assembly which accepts standard iron pipe without surface preparation although such pipe has a loose diameter tolerance; for example, a one inch pipe may vary a plus or minus .025 inch.

Fifth, to provide a pipe coupling and means and method of assembly which not only establishes a satisfactory seal, but also provides a connection between adjacent pipe which is stronger than the pipe; that is, in tension tests the pipe sections fail before the coupling or the connected parts.

Sixth, to provide a pipe coupling and means and method of assembly which is particularly advantageous when joining pipe sections located in awkward places or joining pipe sections which cannot be rotated or moved axially during assembly.

Seventh, to provide a coupling of this type which may be employed to join plastic pipe to metal pipe or metal fittings.

Description of figures

FIGURE 9 is a side view of the means for assembling the coupling onto the abutting ends of two pipe sections, the apparatus being shown in its initial condition just prior to action of its constricting dies.

FIGURE 10 is a similar side view, showing the apparatus fragmentarily, and in the condition assumed upon completion of the assembly operation.

FIGURE 11 is a fragmentary sectional view, taken through 11—11 of FIGURE 9.

FIGURE 12 is a sectional view taken through 12—12 of FIGURE 9 with the pipe and coupling omitted.

FIGURE 13 is a perspective view of the fixture for facilitating positioning of the coupling.

Specification

Figure 1:
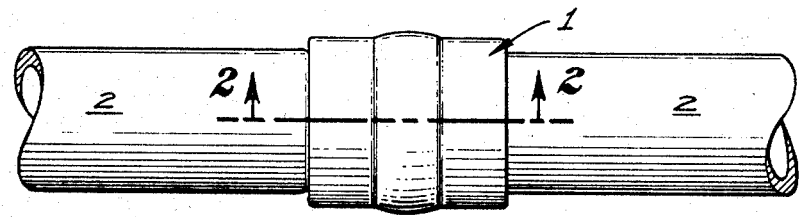
FIGURE 1 is a side view of the pipe coupling and adjacent portions of the pipe sections joined by the coupling.
Figure 2:
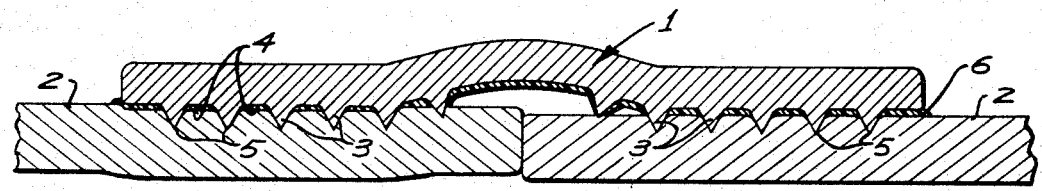
FIGURE 2 is an enlarged fragmentary longitudinal sectional view, taken through 2—2 of FIGURE 1.
Figure 3:
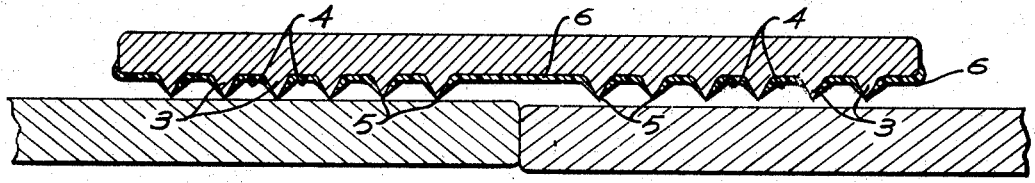
FIGURE 3 is a sectional view similar to FIGURE 2, showing the same parts before the pipe coupling has been secured in place.

The coupling is in the form of a sleeve 1, initially dimensioned to fit slidably over a pair of abutting pipe sections 2. The coupling sleeve is intended primarily for use with iron pipe and is therefore preferably formed of the same material from which the pipe is made. An iron alloy corresponding to that from which standard iron pipe is made has been found satisfactory.

The sleeve 1 is provided with a series of internal annular teeth 3, separated by annular channels 4 which are cylindrical and have an optimum width approximately twice the width of the individual teeth. The teeth are triangular in cross section, and form radially inwardly directed apexes 5. The optimum included angle of these apexes is in the order of sixty but may range between forty and eighty degrees.

Initially, the diameter of the coupling is such that the annular teeth 3 slidably receive a corresponding end of a pipe section 2. When the coupling has been assembled on the pipe and secured in position, the coupling has been constricted an amount equal to the depth of the teeth 3, and the teeth have penetrated into the pipe sections their full depth, the coupling is fully secured to the pipe.

It should be noted that for many conditions of use, the intimate fit between the annular teeth 3 and the underlying pipe sections provides a complete seal without the use of an intervening seal. However, to ensure a seal in every instance, the inner surface of the coupling may be coated with a sealant 6, such as rubber or other elastomer, or other plastic material having elastomeric qualities. It will be noted that the sealant tends to collect in the channels 4 and when the coupling is constricted onto the pipe ends, the coating is severed into bands by pressure of the teeth 3 against the pipe sections. The thickness of the sealant coating may be minimal and the coupling sleeve is constricted to the point that the sealant coating completely fills the spaces between the bottoms of the channels 4 and the confronting surface of the pipe section.

Figure 7:
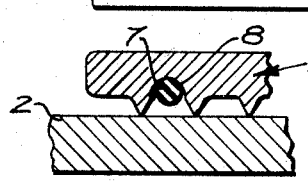
FIGURE 7 is a fragmentary sectional view showing a modified form of the coupling incorporating an O-ring type seal before being secured to a pipe.
Figure 8:
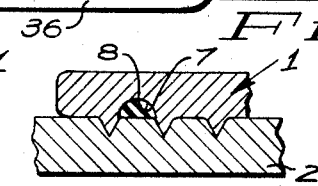
FIGURE 8 is a similar view showing the modified form of coupling secured to an end of a pipe.

Alternatively, as shown in FIGURES 7 and 8, one or more of the channels at each end may be deepened to form a seal ring groove 7 which receives a seal ring 8. Each seal ring may be a conventional O-ring and the effective area of the groove 7 when the coupling is secured is preferably equal to or slightly less than the cross section of the seal ring to place the material comprising the seal ring under compression.

Figures 4, 5:
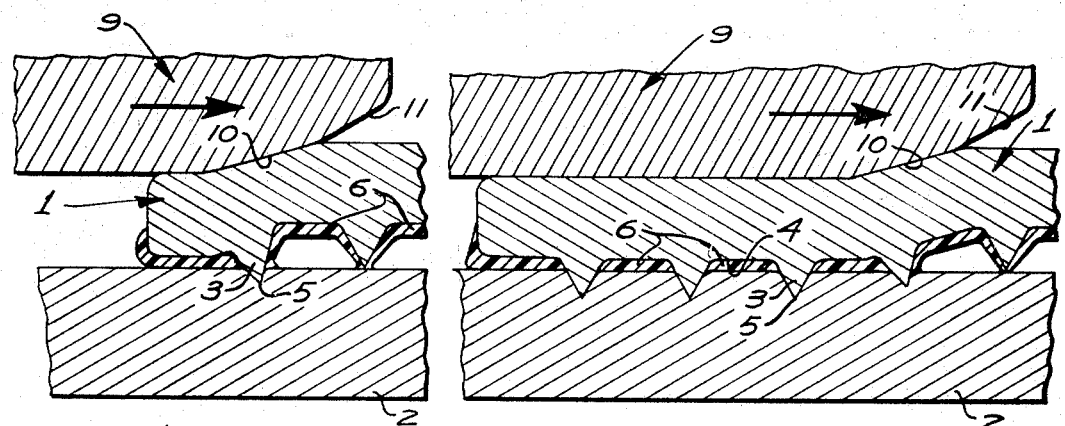
FIGURE 4 is a further enlarged fragmentary sectional view showing the pipe coupling and underlying pipe end and a constricting die in the initial step of constricting the pipe coupling onto the end of a pipe.
FIGURE 5 is a enlarged fragmentary sectional view similar to FIGURE 4, showing further progress of the step of constricting the pipe coupling onto an end of a pipe.

Constriction of the coupling sleeve is accomplished by annular constriction dies 9. Each die includes a constricting cone 10, having a working length approximately equal to the distance between the teeth 3, and a clearance end cone 11 preceding the working or constricting cones 10. As will be brought out in more detail hereinafter, the constricting dies 9 are thrust axially toward each other from the extremities of the coupling sleeve so that the teeth 3 are pressed consecutively into the ends of the pipe sections 2, as represented in FIGURES 4 and 5.

It should be noted that standard iron pipe does not have a precise outer diameter; in fact, the diameter may vary as much as a sixteenth of an inch. In order to develop the full strength of the teeth 3, it is desirable that the teeth penetrate their full depth into the pipe sections, or nearly so. Therefore, the constricting dies are dimensioned so that essentially full penetration will be obtained when securing the coupling to a pipe of minimum diameter. If the pipe be of maximum diameter, the pipe itself is constricted or reduced in diameter by the dies 9.

As indicated previously, the volume of the seal ring grooves 7 is equal to the volume of the seal rings so that when the coupling sleeve is constricted, the seal rings completely fill their respective grooves and may even be under compression, but cannot flow from the groove due to the intimate fit between the bordering teeth 3 and the underlying pipe section 2.

The means for assembling the coupling and the pipe sections will now be described.

The assembling means includes a base plate 12, on which is mounted a fixed die holder 13. Two guide and tension bars 14 extend from the fixed die holder and are secured to a fixed abutment block 15 mounted on the base plate 12. A slidable die holder 16 is mounted on the bars and a slidable abutment block 17 is also mounted on the bars 14.

Other than that the one die holder is fixed and the other slidable, the die holders 13 and 16 are identical. Each is provided with a central opening 18 and a side slot 19 dimensioned to clear the pipe section. Each die holder is provided with a die recess 20, having tapered side walls and terminating in a thrust shoulder 21. Each constricting die 8 is in the form of a diametrically split ring, the parts of which are held in complementary relation by the walls of the recess 20. The walls of the die holders are relatively heavy and the die holders are preferably heat treated so as to resist any expansion force exerted by the dies.

It has been found desirable to provide set screws 22 which extend radially through the die holders and engage the pipe sections merely to hold the pipe sections in place during installation of the pipe sections and the coupling sleeve in the assembling means.

As an aid in positioning the pipe sections and coupling in the assembling means, a placement fixture 23 is provided which includes a yoke 24 adapted to be slipped laterally over one of the pipe sections and secured thereto by a set screw 25. A semi-cylindrical blade 26 extends axially from the yoke 24 and is provided with a reference shoulder 27 located one half the length of the coupling from the extremity of the blade. The yoke is fastened temporarily to one of the pipe sections in such a manner that the distance from the end of the blade 26 to the extremity of the pipe section is equal to the distance between the extremity of the blade and the reference shoulder 27. This can easily be done by casual observation as slight difference in the inserted depth of the two pipe sections is not critical. The yoke is placed on the pipe section which is received in the fixed die holder 13.

After the pipe sections and coupling have been placed in the die holders, and the dies have been fitted into the recesses 20, the slidable die holder 16 is moved manually toward the fixed die holder until the dies are abutting the ends of the coupling sleeve.

In order to force the dies toward each other and towards the center of the coupling sleeve, a ram unit is placed between the slidable abutment block 17 and the fixed abutment block 15. The ram unit includes a pair of L-shaped frames 28, having relatively short arms which are joined together by a pivotal connection 29. The remaining or larger arms of the L-frames are drawn together by a spring 30 placed therebetween. Also placed between the ram frames is a cylinder 31 and a piston 32, and interposed between the piston and cylinder and their respective ram frames are bearing pins 33. The extremities of the ram frames remote from the pivotal connection 29 are provided with cam faces 34 which engage the abutment blocks 15 and 17. Adjacent the cam faces are positioning shoulders 35 which rest on the abutment blocks 15 and 17.

In order to operate the ram unit, pressure fluid is supplied from a pressure line, not shown. The pressure fluid causes the ram piston 32 to extend from the cylinder 31, forcing the cam faces 34 away from each other and thus forcing the slidable abutment block 17, slidable die holder 16 and its die toward the fixed die holder and its die so that the die holders move from the position shown in FIGURE 9 to the position shown in FIGURE 10, and the construction dies 9 are caused to move progressively along the coupling sleeve 1.

It will be noted that by reason of the fact that the axial length of the constricting cones 10 approximates the distance between adjacent teeth 3, the teeth are constricted in sequence and the amount of force required is minimized. In order that the teeth will readily withstand the loads imposed, and be capable of penetrating the ends of the pipe sections, the teeth are case-hardened. Preferably, the teeth are hardest at their apexes and gradually decrease in hardness toward their root ends. The sleeve itself is preferably annealed.

It has been found that a small conventional hydraulic hand pump is adequate for effecting the assembly operation of a conventional iron pipe and the coupling of nominally one-inch diameter. When the assembly operation is completed, the pressure fluid is released for return to the pumping unit and the spring 30 returns the piston 32 into the cylinder 31. Whereupon the assembled coupling and pipe sections may be removed. It will be noted that the assembling means is relatively compact so that it may be employed in cramped spaces. Also, it will be noted that no axial or rotational movement of the pipe sections is required.

It has been determined that a coupling constructed and assembled as hereinbefore described is fully capable of withstanding the loads imposed on the pipe sections joined by couplings. In this regard, one can consider that each pipe end is divided into a series of bands equal in width to the distance between adjacent teeth. The depth of penetration of the teeth and the number of bands should be such that the collective sheer strength of the teeth equal the tensile strength of the pipe. More specifically: The compressive load each band will support is $$2ltC$$

where:

$l$ = axial length of the band
$t$ = wall thickness of the band
$C$ = compressive strength of the metal The load the annual tooth imposes at its point of maximum depth is $$DWC$$

where:

$D$ = the mean diameter of the band
$W$ = width of the base of the tooth at its point of maximum penetration into the surface of the band Then:
$$2ltC = DWC$$
and
$$2lt = DW$$
$$l = l/N$$

where, $N$ = number of teeth per inch and then:

(1) $$N = 2t/DW$$

The cumulative strength of the teeth when engaged in the pipe end will equal:

$$NLD_1 W \pi S_1$$

where:

$L$ = length of the pipe end engaged
$D_1$ = outside diameter of the pipe
$S_1$ = shear strength of the tooth metal and this must be equal to the tensile strength of the pipe which is:

$$\frac{\pi (D_1^2 - D_2^2) S_2}{4}$$

where:

$D_2$ = the inside diameter of the pipe
$S_2$ = tensile strength of the pipe

Then $$NLD_1 W S_1 = \frac{(D_1^2 - D_2^2) S_2}{4}$$

(2)
$$L = \frac{(D_1^2 - D_2^2) S_2}{4 N D_1 W S_1}$$

$W$ is determined by the shape of the V form of the teeth selected and the depth of penetration of the teeth into the surface of the pipe which is the minimum necessary.

A sufficient depth of tooth penetration is necessary so that a thin surface layer of the pipe will not shear off before the pipe breaks in tension. By way of example, for ¾-inch pipe this depth with a 60° V form tooth was about .016 inch for 10 ridges per inch and a ridge engaged length of about ½ inch.

Figure 6:
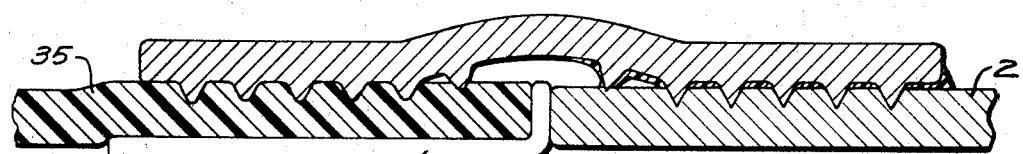
FIGURE 6 is a fragmentary sectional view corresponding to FIGURE 2, showing a modified form of the coupling for joining a plastic pipe to a metal pipe.

Thus to produce a joint of optimum strength, the following factors should be considered:

(1) Diameter of pipe
(2) Wall thickness of pipe
(3) Length of pipe end engaging in coupling
(4) Distance between teeth
(5) Effective height of teeth
(6) Hardness of teeth
(7) Profile of teeth Reference is directed to FIGURE 6 which illustrates a modification for joining a plastic pipe 35 to a metal pipe 2, or fitting having a similar end. In this case, a metal sleeve 36 is placed inside the end of the plastic pipe to support the plastic pipe. The sleeve 1, metal pipe 2 and plastic pipe 35 are assembled and the sleeve constricted as previously described. It is preferred, however, to modify the annular ribs engaging the plastic pipe by rounding their inner extremities to avoid cutting the plastic material. Also, if desired, the seal 6 or seal ring 8 may be omitted from the end of the coupling receiving the plastic pipe, as the plastic pipe itself readily serves this purpose.

While particular embodiments of this invention have been shown and described, it is not intended to limit the same to the details of the construction set forth, but instead, the invention embraces such changes, modifications and equivalents of the various parts and their relationships.

I claim:

1. A coupling member for coupling metal pipe ends cut to length but otherwise unfinished, said coupling member comprising:
   (a) a sleeve of malleable metal initially of essentially uniform external diameter;
   (b) a plurality of axially spaced annular teeth extending radially inward from the internal surface of said sleeve arranged in groups adjacent opposite ends of said sleeve, said teeth having, initially, an internal diameter sufficient to fit slidably over the outer surface of said pipe ends;
   (c) said teeth being surface-hardened for penetration into said pipe ends;
   (d) an annular body of elastomeric sealing material between at least two adjacent teeth of each group, and
   (e) said sleeve and group of teeth adjacent each end thereof being progressively constricted to cause penetration of said teeth through said sealing material into said pipe ends.

2. A coupling assembly, as defined in claim 1, wherein:
   (a) said teeth are essentially triangular in cross section and have radially inner apices;
   (b) and said teeth are spaced apart a distance greater tran their axial width whereby a constricting force may be applied to said teeth individually.

3. A coupling, as defined in claim 1, wherein:
   (a) said sealing body comprises a groove between a pair of said teeth near each end of said sleeve; and a seal ring in each groove;
   (b) each seal ring, on constriction of said seal ring, being distorted to fill its groove.

4. A coupling, as defined in claim 1 wherein:
   (a) the set of teeth at one end of said sleeve has rounded apices and said end being adapted to receive the end of a plastic pipe having a supporting sleeve therein.

5. A coupling assembly, comprising:
   (a) a pair of pipe sections cut to length but otherwise unfinished disposed in axially aligned and end-abutting relation;
   (b) a single substantially rigid sleeve of malleable metal overlying the extremities of both said pipe sections, said sleeve having a constricted portion extending from near its center to each end;

(c) an annular body of elastomeric sealing material between at least two adjacent teeth of each group and being compressed between said sleeve and the adjacent pipe section, and (d) a plurality of axially spaced circumferentially extending surface-hardened teeth within each constricted portion and arranged in groups adajcent opposite ends of said sleeve and penetrating the surface of the corresponding pipe (e) an annular body of elastomeric sealing material between at least two adjacent teeth of each group and being compressed between said sleeve, said teeth and adjacent pipe section.

6. A coupling assembly, as defined in claim 5, wherein:
(a) said sealing body includes an internal coating of sealing material compressed between said teeth.

7. A coupling assembly, as defined in claim 5, wherein:
(a) said teeth are annular;
(b) said sealing means includes an annular groove located between a pair of teeth near each extremity of said sleeve, and a sealing ring is compressed in each groove.

8. A coupling assembly, as defined in claim 5, wherein:
(a) one of said pipe sections is formed of plastic material;

(b) the apices of the corresponding teeth are rounded;
(c) and an inner sleeve underlies the plastic pipe section.

References Cited
UNITED STATES PATENTS

| | | | |
|---|---|---|---|
| 1,911,775 | 5/1933 | Smith et al. | 285—382.2 X |
| 2,613,959 | 10/1952 | Richardson | 285—382.2 X |
| 2,805,591 | 9/1957 | Widmer | 285—382 X |
| 2,814,514 | 11/1957 | Seamark | 285—371 X |
| 2,926,029 | 2/1960 | St. Clair et al. | 285—382 X |
| 3,002,770 | 10/1961 | Chestnut et al. | 285—355 X |
| 3,149,861 | 9/1964 | Larsson | 285—382.2 X |
| 3,343,252 | 9/1967 | Reesor | 285—382.2 X |
| 3,210,102 | 10/1965 | Joslin | 285—382.2 X |

FOREIGN PATENTS

| | | |
|---|---|---|
| 796,065 | 6/1958 | Great Britain. |

DAVID J. WILLIAMOWSKY, Primary Examiner

WAYNE L. SHEDD, Assistant Examiner

U.S. Cl. X.R.

285—382